(12) United States Patent
Lewis (10) Patent No.: US 12,286,078 B2
(45) Date of Patent: Apr. 29, 2025

(54) VEHICLE DOOR WELL STEP APPARATUS

(71) Applicant: Pride Manufacturing Company, LLC, Brentwood, TN (US)

(72) Inventor: Rodney Lewis, Brentwood, TN (US)

(73) Assignee: Pride Manufacturing Company, LLC, Brentwood, TN (US)

( * ) Notice: Subject to any disclaimer, the term of this patent is extended or adjusted under 35 U.S.C. 154(b) by 0 days.

(21) Appl. No.: 18/460,639

(22) Filed: Sep. 4, 2023

(65) Prior Publication Data

US 2024/0059222 A1  Feb. 22, 2024

Related U.S. Application Data (63) Continuation of application No. 17/308,237, filed on May 5, 2021, now Pat. No. 11,745,664, which is a continuation of application No. 16/145,428, filed on Sep. 28, 2018, now Pat. No. 11,007,943, which is a continuation of application No. 15/864,655, filed on Jan. 8, 2018, now Pat. No. 10,155,479.

(60) Provisional application No. 62/443,890, filed on Jan. 9, 2017.

(51) Int. Cl.
*B60R 3/00* (2006.01)

(52) U.S. Cl.
CPC .................... *B60R 3/007* (2013.01)

(58) Field of Classification Search
CPC ..................................... B60R 3/007
See application file for complete search history.

(56) References Cited

U.S. PATENT DOCUMENTS

| | | | |
|---|---|---|---|
| 283,959 A | 8/1883 | Bowyer et al. |
| 753,334 A | 3/1904 | Vaughan |
| 810,199 A | 1/1906 | Erret |
| 2,907,402 A | 10/1959 | Lewis |
| 2,975,858 A | 3/1961 | Billingsley |
| 3,159,242 A | 12/1964 | James |
| 3,357,719 A | 12/1967 | McCrea |
| 3,892,290 A | 7/1975 | Lang |
| 4,257,492 A | 3/1981 | Rasada, Jr. et al. |
| 4,556,125 A | 12/1985 | Johnson |

(Continued)

FOREIGN PATENT DOCUMENTS

| CA | 2284236 | 6/2005 |
|---|---|---|
| CA | 3024597 A1 | 10/2019 |

(Continued)

OTHER PUBLICATIONS

Car Cane Nov. 16, 2016; Retrieved from Internet <http://www.carcane.com/>.

(Continued)

*Primary Examiner* — Bryan A Evans
(74) *Attorney, Agent, or Firm* — Dentons Durham Jones Pinegar; Sarah W. Matthews (57) ABSTRACT

Step apparatuses that removably couple to a door latch element (e.g., a U-shaped striker element) of a vehicle are described. A step apparatus may include a hook element that enables the step apparatus to hang from a door latch element in a vehicle door well. A step apparatus may also be able to extend through a door latch element such that the step apparatus may couple to the door latch element in an upright position. A step apparatus may include one or more than one step structure.

20 Claims, 5 Drawing Sheets

(56) References Cited

U.S. PATENT DOCUMENTS

| | | |
|---|---|---|
| 4,605,098 A | 8/1986 | Leuty |
| D296,431 S | 6/1988 | Yont |
| 6,340,189 B1 | 1/2002 | Pordy |
| 6,584,643 B1 | 7/2003 | Tomaiuolo |
| 6,799,353 B1 | 10/2004 | Stewart |
| 8,006,803 B2 | 8/2011 | Guering |
| 8,235,266 B2 | 8/2012 | Sautter et al. |
| 8,720,460 B2 | 8/2014 | Chen et al. |
| 9,296,323 B2 | 3/2016 | Voisin |
| 9,403,466 B1 * | 8/2016 | Deng ............... F21L 4/00 |
| 9,475,432 B1 | 10/2016 | Rauschert |
| 9,533,611 B2 | 1/2017 | Deng et al. |
| 9,700,109 B2 | 7/2017 | Gordin |
| 9,737,120 B2 | 8/2017 | Gordin |
| 10,562,455 B2 | 2/2020 | Mao |
| 10,723,273 B1 | 7/2020 | Gray |
| 2002/0189903 A1 | 12/2002 | Krish, Jr. |
| 2005/0076821 A1 | 4/2005 | Baker |
| 2005/0133078 A1 | 6/2005 | Fujitsubo |
| 2005/0247519 A1 | 11/2005 | Reid |
| 2008/0277199 A1 | 11/2008 | Castonguay |
| 2015/0145268 A1 | 5/2015 | Voisin |
| 2016/0243968 A1 | 8/2016 | Deng et al. |
| 2017/0334257 A1 | 11/2017 | Stickles |
| 2021/0253028 A1 | 8/2021 | Lewis |

FOREIGN PATENT DOCUMENTS

| | | |
|---|---|---|
| CN | 201099218 Y | 8/2008 |
| CN | 104842882 A | 8/2015 |
| CN | 208149179 U | 11/2018 |
| CN | 208646734 U | 3/2019 |
| CN | 208698641 U | 4/2019 |
| CN | 110641373 A | 1/2020 |
| CN | 114919500 A | 8/2022 |
| WO | 0119642 A2 | 3/2001 |

OTHER PUBLICATIONS

Canadian Intellectual Property Office, First Office Action, Application No. 3,049,121, Feb. 10, 2023, 3 pages.
European Patent Office, Communication Pursuant to Article 94(3) EPC, Application No. 18735866.8, Jul. 8, 2022, 16 pages.
European Patent Office, "Extended European Search Report," for European Patent Application No. 24176453.9, Oct. 7, 2024.

* cited by examiner

VEHICLE DOOR WELL STEP APPARATUS

CROSS REFERENCE TO RELATED APPLICATIONS

This application is a continuation of U.S. patent application Ser. No. 17/308,237 filed May 5, 2021, now U.S. Pat. No. 11,745,664, which is a continuation of U.S. patent application Ser. No. 16/145,428, filed Sep. 28, 2018, now U.S. Pat. No. 11,007,943, which is a continuation of U.S. patent application Ser. No. 15/864,655, filed Jan. 8, 2018, now U.S. Pat. No. 10,155,479, which claims benefit of U.S. Provisional Application Ser. No. 62/443,890, filed on Jan. 9, 2017. The aforementioned patent applications are hereby incorporated by reference in their entireties.

BACKGROUND

People have routinely placed items on the roof of their vehicle. For example, people may place outdoor equipment, luggage, or other items on a rack on top of their vehicle. For taller vehicles and/or short individuals, it may be difficult for a person to easily access items located on the roof of a vehicle.

SUMMARY

The present disclosure provides step apparatuses that removably couple to a door latch element (e.g., a U-shaped striker element) of a vehicle. Step apparatuses of the present disclosure may include one or more than one step and may be sized to accommodate use with vehicles of various heights and various sized door latch elements.

An aspect of the present disclosure relates to a step apparatus including a load-supporting step structure having a flat step surface sized to provide a substantially horizontal step when the step apparatus is releasably coupled to a latch element disposed within a vehicle door well. The step apparatus also includes an elongate support element coupled to the load-supporting step structure and configured to releasably couple to the latch element.

Another aspect of the present disclosure relates to a step apparatus including a load-supporting step structure having a step surface and an elongate support element coupled to the load-supporting step structure and configured to releasably couple to a latch element disposed within a vehicle door well.

BRIEF DESCRIPTION OF THE DRAWINGS

For a more complete understanding of the present disclosure, reference is now made to the following description taken in conjunction with the accompanying drawings.

DETAILED DESCRIPTION

The present disclosure relates to step apparatuses for providing steps that are removably coupled to a door latch element of a vehicle. While the below discloses step apparatuses that may be used with door latch elements of vehicles, the present disclosure is not so limited. One skilled in the art will appreciate that the step apparatuses of the present disclosure may removably couple to door latch elements of objects other than vehicles and additionally may removably couple to objects other than door latch elements.

A step apparatus of the present disclosure includes a load-supporting step structure and an elongate element for anchoring the step apparatus to a latch element disposed within a door well. The latch element can include a conventional "striker" latch portion of a vehicle's door latch mechanism. The door latch mechanism can include a U-shaped latch element attached to the door well of the vehicle thereby allowing for the step apparatus to be removably coupled thereto without modification to the door well itself. The step apparatus can be coupled to door latch element when the door of the vehicle is open (or slightly open). The step apparatus can be used to easily access the roof of the vehicle to which it is coupled. The removability of the step apparatus from the door well of the vehicle allows for use of the step apparatus without alteration to the vehicle. As such, the present disclosure provides a simple, unique, and novel manner in which to provide a step to access the roof of a vehicle without alteration to the vehicle itself.

Figure 1:
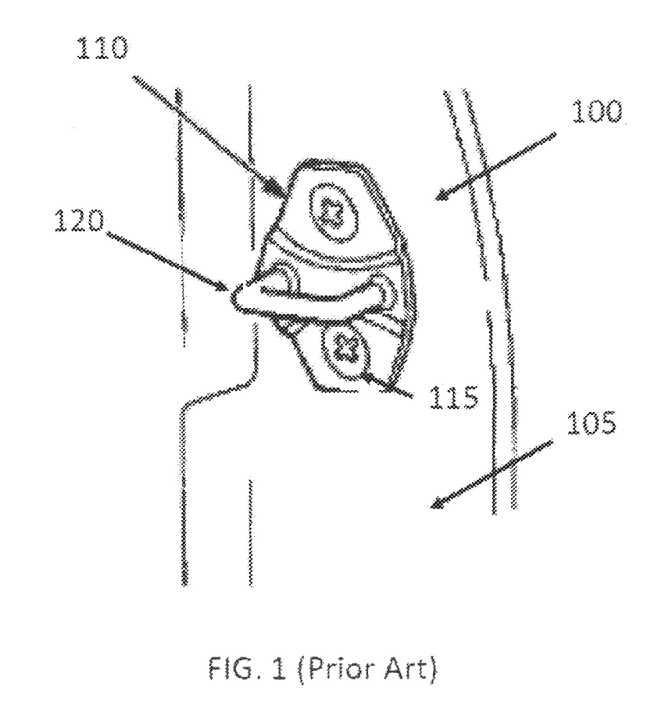
FIG. 1 illustrates a door latch element within a door well.

Referring to FIG. 1, a conventional door latch element 100 is illustrated. The door latch element 100 is disposed within a door well 105 of a vehicle. Often the door latch element 100 is disposed on the interior of the door well 105 of the vehicle approximately half way between a floor and a roof (not illustrated) of the door well 105. The door latch element 100 is also often disposed opposite to a hinge that attaches a door of the vehicle to the door well 105. Such is well known in the art and therefore is not discussed in detail herein. The door (not shown) generally includes complementary latch elements that secure the door to the door latch element 100 when the door is in the closed position. When the door is in an open position, the door latch element 100 is exposed, as illustrated in FIG. 1.

The door latch element 100 includes a base plate 110 that is affixed to the door well 105 using one or more fasteners 115 (e.g., mechanical screws, bolts, or other mechanical and non-mechanical fasteners). As illustrated, the fasteners 115 are mechanical screws or bolts securing the base plate 110 to the door well 105. The door latch element 100 also includes a U-shaped latch element 120 extending from the base plate 110. The U-shaped latch element 120 and the base plate 110 may together form a void configured to allow interlocking features of the door latch mechanism to connect to the U-shaped latch element 120.

While the present disclosure describes step apparatuses being removably coupled to the door latch element 100, one skilled in the art will appreciate that the step apparatuses of the present disclosure may removably couple to differently sized and/or shaped door latch elements 100 and/or other aspects of door latch mechanisms (e.g., a mechanism located on the door of the vehicle, an aperture located on the door, etc.) without departing from the spirit and scope of the present disclosure.

Figure 2A:
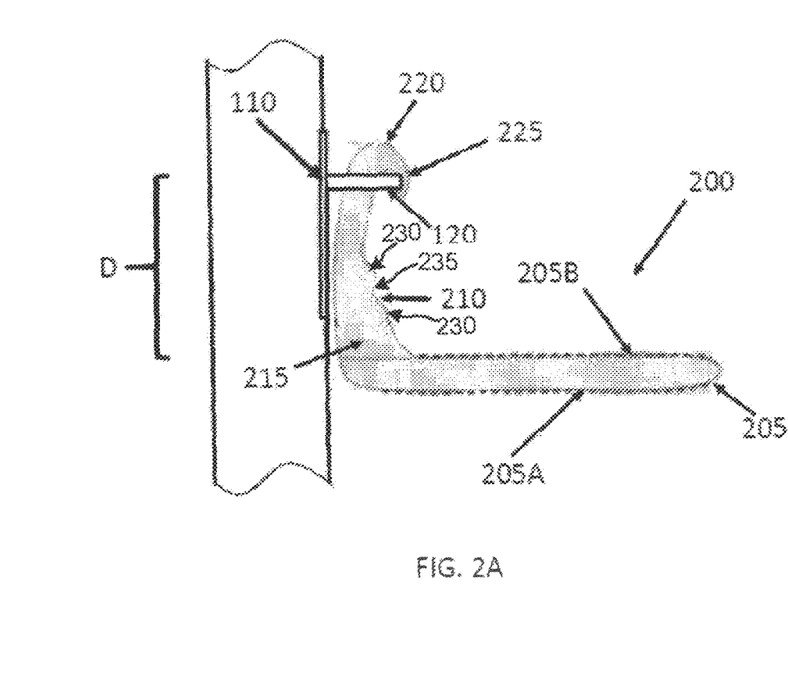
FIG. 2A is a side view of a step apparatus removably coupled to a door latch element in a first configuration according to embodiments of the present disclosure.
Figure 2B:
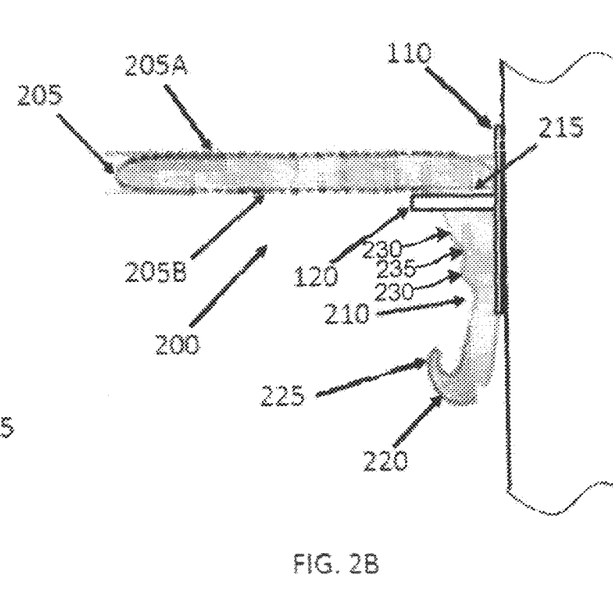
FIG. 2B is a side view of a step apparatus removably coupled to a door latch element in a second configuration according to embodiments of the present disclosure.

Referring to FIGS. 2A and 2B, a step apparatus 200 is illustrated. The step apparatus 200 is removably coupled to the door latch element 100 disposed within a vehicle's door well. The step apparatus 200 can be used in both a hanging position as illustrated in FIG. 2A or an upright position as illustrated in FIG. 2B.

The step apparatus 200 includes a load-supporting step structure 205 having a first flat or substantially flat step surface 205A sized to provide a horizontal or substantially horizontal step when the step apparatus 200 is coupled to the door latch element 100 in the upright position as illustrated in FIG. 2B. The step structure 205 can also include a second flat or substantially flat step surface 205B sized to provide a horizontal or substantially horizontal step when the step apparatus 200 is coupled to the door latch element 100 in the hanging position as illustrated in FIG. 2A.

The step apparatus 200 includes an elongate support element 210 connected to the step structure 205. The elongate support element 210 is configured to releasably couple the step apparatus 200 to the door latch element 100.

As previously discussed, the door latch element 100 may include a void defined by the U-shaped latch element 120 and the base plate 110. The elongate support element 210 may extend within and through the void. The elongate support element 210 can extend substantially entirely through the void (as illustrated in FIG. 2B) or can partially extend through the void (as illustrated in FIG. 2A).

The elongate support element 210 can include a first end 215 that is proximate to the step structure 205 and a second end 220 that is distal from the step structure 205 along the elongate support element 210. The elongate support element 210 can include a hook-shaped element 225 disposed at the second end 220 of the elongate support element 210. The hook-shaped element 225 removably couples to the U-shaped latch element 120, thereby enabling the step apparatus 200 to hang from the U-shaped latch element 120 such that the first step surface 205A is located a predetermined distance D from a top surface of the U-shaped latch element 120 (as illustrated in FIG. 2A). One skilled in the art will appreciate that the distance D may be altered by altering a length of the elongate support element 210 and/or altering a configuration of the hook-shaped element 225. The distance D may be configured in view of the vehicle(s) to which the step apparatus 200 is to couple, the size of the user of the step apparatus 200, as well as other considerations. One skilled in the art will additionally appreciate that the size of the hook-shaped element 225 may vary, provided that the hook-shaped element's size permits the second end 220 of the elongate support element 210 to extend through the void of the door latch element 100.

The first end 215 of the elongate support element 210 can be thicker than the second end 220 of the elongate support element 210. This may provide additional structural support to the step element 205 at an intersection of the elongate support element 210 and the step element 205. One skilled in the art will appreciate that the thickness and strength of the first end 215 of the elongate support element 210 may vary depending on the weight of a human that is intended to use the step apparatus 200.

The elongate support element 210 may include one or more convex portions (or protrusions) 230 and one or more concave portions (or indentations) 235. The convex portion(s) 230 and the concave portion(s) 235 may add rigidity to the elongate support element 210, thereby allowing the step apparatus 200 to support greater amounts of weight.

The convex portion(s) 230 and the concave portion(s) 235 may also be configured to couple to the U-shaped latch element 120. One skilled in the art will appreciate that the U-shaped latch element 120 may be configured smaller than that illustrated in FIGS. 2A and 2B.

The smaller U-shaped latch element 120 may be sized such that the elongate support element 210 may not fully extend through the void of the door latch element 100 to an extent where the second step surface 205B is able to contact the U-shaped latch element 120. Yet, the smaller U-shaped latch element 120 may be sized such that the elongate support element 210 may extend through the void such that the convex portion(s) 230 and the concave portion(s) 235 may contact the U-shaped latch element 120 and support use of the step apparatus 200 by a human in such a configuration. Therefore, the convex portion(s) 230 and the concave portion(s) 235 may enable the step apparatus 200 to be used with door latch elements 100 of various sizes.

The dimensions, size, and strength of the step element 205 may be configured based on sizes and proportions of humans. For example, the size of the step element 205 can be based on the size of human feet. Sizes and proportions of humans are known through anthropometry, which refers to the measurement of the human individual. The various anthropometric reference data for children and adults is periodically released by the National Health Statistics Reports and includes data for sizes of limbs, weights, and other human statistics, which may be considered in designing various characteristics and parameters of the step apparatus 200 including, for example, the size and strength of the step element 205 and the elongate support element 210. For example, the below reproduced table illustrates common weight in kilograms for males age 20 and over. One skilled in the art will appreciate that similar data related to foot length and breadth may also be considered in designing characteristics and parameters of the step apparatus 200.

TABLE 5

Weight in kilograms for males aged 20 and over and number of examined persons, mean, standard error of the mean, and selected percentiles, by race and ethnicity and age: Unites States, 2007-2010

| Race and ethnicity and age | Number of examined persons | Mean | Standard error of the mean | Percentile | | | | | | | | |
|---|---|---|---|---|---|---|---|---|---|---|---|---|
| | | | | 5th | 10th | 15th | 25th | 50th | 75th | 85th | 90th | 95th |
| racial and ethnic groups[1] | | | | | | | | | | | | |
| 20 years and over | 5.651 | 88.7 | 0.45 | 61.5 | 68.5 | 69.7 | 75.0 | 66.1 | 98.9 | 107.2 | 114.4 | 124.1 |
| 20-29 years | 894 | 83.4 | 0.85 | 58.4 | 62.6 | 65.3 | 69.5 | 80.1 | 93.7 | 101.6 | 109.0 | 116.8 |
| 30-39 years | 948 | 90.5 | 0.75 | 63.3 | 67.8 | 70.8 | 76.4 | 86.7 | 101.1 | 110.1 | 117.8 | 128.00 |
| 40-49 years | 933 | 91.0 | 0.96 | 64.4 | 69.5 | 73.5 | 78.5 | 87.9 | 100.6 | 108.6 | 116.2 | 126.3 |
| 50-59 years | 934 | 91.3 | 1.10 | 63.8 | 69.0 | 72.9 | 78.2 | 88.6 | 102.9 | 109.8 | 117.6 | 126.6 |
| 60-69 years | 933 | 90.5 | 0.76 | 61.7 | 67.9 | 70.9 | 78.4 | 88.5 | 101.2 | 108.3 | 115.1 | 127.4 |
| 70-79 years | 649 | 66.5 | 0.88 | 62.6 | 66.8 | 70.4 | 75.1 | 84.7 | 95.1 | 102.9 | 109.4 | 117.9 |
| 80 years and over | 360 | 79.3 | 0.81 | 57.6 | 61.5 | 64.1 | 69.0 | 77.9 | 88.2 | 94.3 | 97.3 | 104.5 |
| Non-Hispanic white | | | | | | | | | | | | |
| 20 years and over | 2.738 | 90.4 | 0.42 | 63.7 | 68.9 | 72.2 | 77.3 | 88.0 | 100.6 | 108.7 | 115.6 | 124.1 |
| 20-29 years | 796 | 88.3 | 0.77 | 61.5 | 65.9 | 69.4 | 73.8 | 85.3 | 98.5 | 107.9 | 113.5 | 122.7 |
| 40-49 years | 832 | 92.9 | 0.71 | 66.4 | 72.1 | 75.0 | 80.4 | 90.0 | 103.1 | 111.9 | 117.7 | 128.7 |
| 60 years and over | 1.110 | 89.0 | 0.56 | 63.5 | 69.0 | 72.2 | 76.6 | 87.0 | 98.5 | 105.6 | 112.6 | 121.0 |
| Non-Hispanic black | | | | | | | | | | | | |
| 20 years and over | 1.094 | 90.4 | 0.74 | 60.9 | 65.1 | 67.9 | 74.0 | 86.8 | 101.6 | 111.4 | 120.1 | 132.5 |
| 20-29 years | 356 | 89.9 | 1.43 | 61.3 | 64.2 | 66.6 | 72.1 | 85.6 | 101.4 | 111.7 | 120.0 | 134.3 |
| 40-49 years | 372 | 92.1 | 1.26 | 60.5 | 66.2 | 71.2 | 78.9 | 89.1 | 103.3 | 113.3 | 120.8 | 132.4 |
| 60 years and over | 366 | 87.8 | 1.15 | 58.0 | 63.8 | 67.1 | 72.0 | 85.3 | 98 | 106.5 | 116.4 | 126.8 |
| Hispanic[2] | | | | | | | | | | | | |
| 20 years and over | 1.541 | 64.4 | 0.88 | 60.4 | 65.0 | 67.3 | 71.4 | 81.6 | 93.2 | 100.2 | 107.3 | 121.0 |
| 20-29 years | 573 | 84.0 | 1.21 | 58.6 | 63.7 | 68.3 | 70.3 | 79.9 | 92.8 | 100.4 | 109.4 | 123.2 |
| 40-49 years | 577 | 85.9 | 0.380 | 64.2 | 68.2 | 70.3 | 74.9 | 83.6 | 94.2 | 101.3 | 105.4 | 117.0 |
| 60 years and over | 391 | 82.0 | 1.13 | 58.6 | 63.0 | 66.5 | 70.2 | 80.4 | 90.9 | 96.6 | 101.5 | 109.4 |
| Mexican American | | | | | | | | | | | | |
| 20 years and over | 991 | 84.1 | 1.04 | 60.4 | 65.0 | 67.3 | 71.3 | 61.4 | 92.6 | 99.2 | 106.9 | 121.4 |
| 20-29 years | 386 | 84.0 | 1.48 | 59.4 | 63.5 | 66.2 | 70.3 | 60.1 | 92.9 | 100.1 | 109.5 | 125.3 |
| 40-49 years | 371 | 85.0 | 0.90 | 64.00 | 68 | 70.1 | 73.9 | 82.8 | 93.7 | 99.7 | 104.0 | 115.8 |
| 60 years and over | 234 | 81.9 | 1.44 | 59.3 | 63.0 | 67.1 | 70.6 | 80.4 | 90.4 | 94.8 | 91.6 | 109.1 |

[1]Persons of other races and ethnicities are included.
[2]Mexican Amercan persons are included in the Hispanic group.
SOURCE: CDC/NCHS, National Health and Nutrition Examinaion Survey The step apparatus 200 can be made of a material such as, but not limited to, extruded aluminum, cast aluminum, steel, titanium, polymer plastics, graphite materials, a combination thereof, or other suitable materials.

Referring to FIGS. 3A through 3E, an example of the step apparatus 200 is illustrated wherein the second end 220 of the elongate support element 210 is sized to extend through the void created by the U-shaped latch element 120 and the base plate 110. The second end 220 of the elongate support element 210 includes a hook-shaped element 225 sized to hang the step apparatus 200 from the U-shaped latch element 120. The elongate support element 210 includes a door well biased surface and a latch element biased surface. For example, when the step apparatus 200 is coupled to the door latch element 100, a first surface 305 is biased against the door well. For further example, when the step apparatus 200 is in the hanging position (as illustrated in FIG. 2A), a second surface 310 (proximate to or encompassed by the second end 220 of the elongate support element 210) is biased against the U-shaped latch element 120. For yet further example, when the step apparatus 200 is in the upright position (as illustrated in FIG. 2B), a third surface 315 (proximate to or encompassed by the first end 215 of the elongate support element 210) may be biased against the U-shaped latch element 120. Such biasing of surfaces may be caused by gravity and/or a non-gravitational force being applied to the step structure 205 by a user or some other object. The second surface 310 may be distal from the step structure 205 along the elongated support element 210 and the third surface 315 may be proximate to the step structure 205 with respect to the elongated support element 210. The step structure 205 may include opposing load-bearing step surfaces 205A and 205B for use in the upright position and hanging position, respectively.

The elongate support element 210 may be configured to have a differently sized first surface 305 depending upon implementation. For example, in a first configuration the first surface 305 may be arched to a first degree, in a second configuration the first surface 305 may be arched to a second degree, etc. One skilled in the art will appreciate that the degree of arching of the first surface 305 may result in a different amount of surface contact between the first surface 305 and the door well (and/or the door latch element 100, and in particular the base plate 110). Different amounts of arching, and as a result different amounts of surface contact, may result in different amounts of wear on paint applied to the door well, different amounts of stabilizing friction between the door well and the first surface 305, as well as other results.

The distance between the second end 220 and the first end 215 of the elongate support element 210 may be selected to place the step structure 205 at a predetermined position within the door well of the vehicle. For example, the predetermined position can be selected to place the step structure 205 at a predetermined distance D (as illustrated in FIGS. 2A and 2B) below the U-shaped latch element 120 of the door latch element 100.

The first step surface 205A and/or the second step surface 205B may have rubber, grip tape, or some other friction providing material applied thereto. Alternatively, the first step surface 205A and/or the second step surface 205B may be manufactured to include rubber or some other friction providing material. In an example, the first step surface 205A and/or the second step surface 205B may include protrusions 320 that provide grip to an object interacting with the first step surface 205A and/or the second step surface 205B. The protrusions 320 may be manufactured as part of the first step surface 205A and/or the second step surface 205B or the protrusions may be manufactured as part of a material that is applied to the first step surface 205A and/or the second step surface 205B.

Figures 3A, 3B:
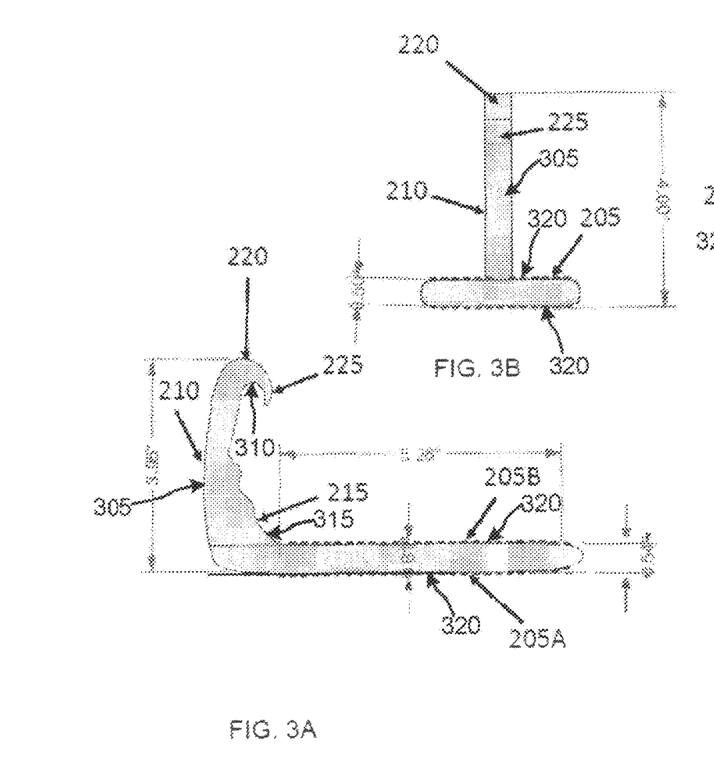
FIG. 3A is a side view of a step apparatus according to embodiments of the present disclosure.
FIG. 3B is a side view of a step apparatus according to embodiments of the present disclosure.
Figure 3C:
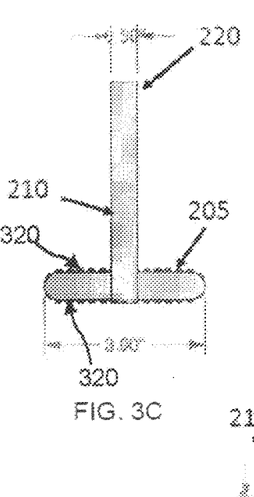
FIG. 3C is a side view of a step apparatus according to embodiments of the present disclosure.
Figure 3D:
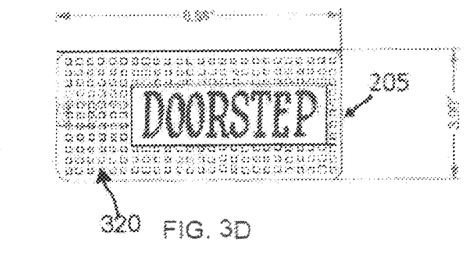
FIG. 3D is a top view of a step apparatus according to embodiments of the present disclosure.
Figure 3E:
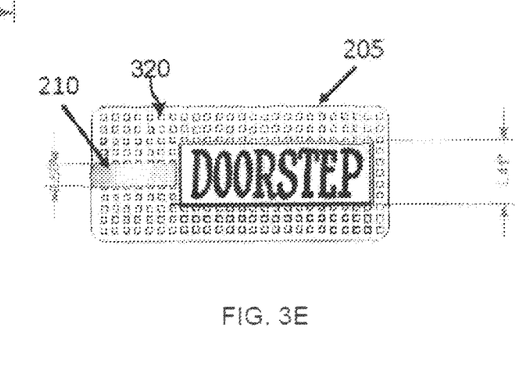
FIG. 3E is a top view of a step apparatus according to embodiments of the present disclosure.

In an example, the elongate support element 210 may be coupled to the second step surface 205B (as illustrated in FIGS. 3A, 3B, and 3D). In another example, the elongate support element 210 may extend at least partially through the step structure 205 (as illustrated in FIGS. 3C and 3E). While not illustrated, one skilled in the art will appreciate that the elongate support element 210 may include one or more surfaces that protrude perpendicularly from a major axis of the elongate support element 210 and that extend along a major plane of the step structure 205 such that the surface(s) may couple to the first step surface 205A and/or the second step surface 205B.

Various dimensions of the step apparatus 200 are illustrated in FIGS. 3A through 3E (and other figures). The dimensions are represented in inches and are merely illustrative. For example, the illustrated dimensions can vary between about 20% and about 100% depending upon implementation requirements. Thus, the dimensions illustrated in FIGS. 3A through 3E are not limiting and can be varied according to alternative, improved, and/or particular applications. One skilled in the art will appreciate that less than all of the dimensions illustrated in FIGS. 3A through 3E may be altered in a single instantiation of the step apparatus 200, or all of the dimensions may be altered. One skilled in the art will further appreciate that scaling of the dimensions illustrated in FIGS. 3A through 3E may or may not be maintained when dimensions are altered from those illustrated.

As previously discussed, aspects of the step apparatus 200 can be varied depending on the location of the door latch element 100 in a door well, the size of the vehicle, the desired height of the step, or on any other basis. In addition, the step apparatus 200 can include more than one step element. For example, referring to FIGS. 4A through 4C, a step apparatus 400 is illustrated having a first step structure 405 and a second step structure 410. The first step structure 405 may be identical to the second step structure 410, or they may be different with respect to size, shape, friction surfaces, or some other feature. The second step structure 410 has a first flat or substantially flat step surface 410A and a second flat or substantially flat step surface 410B sized to provide a second horizontal or substantially horizontal step 410 when the step apparatus 400 is coupled to the door latch element 100 in the hanging and upright configurations, respectively.

Figure 4A:
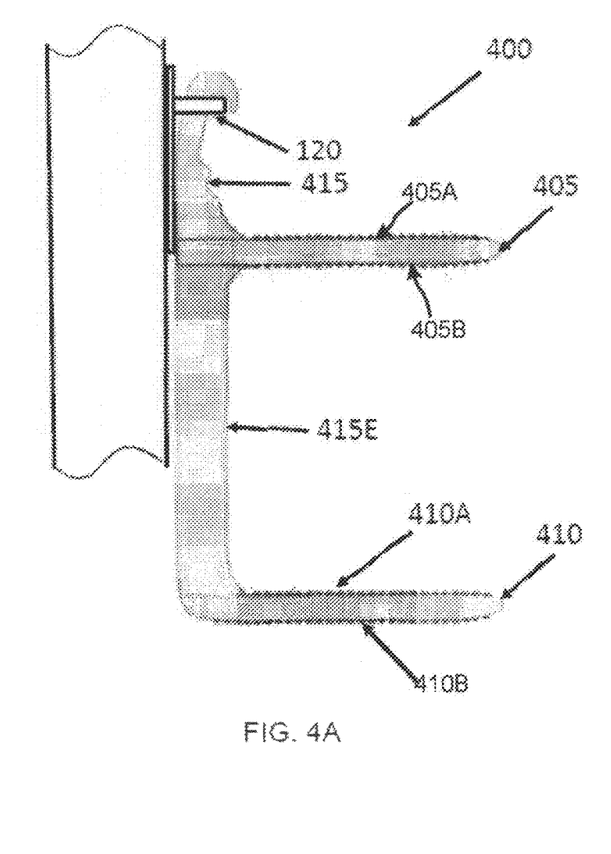
FIG. 4A is a side view of a step apparatus removably coupled to a door latch element according to embodiments of the present disclosure.
Figure 4B:
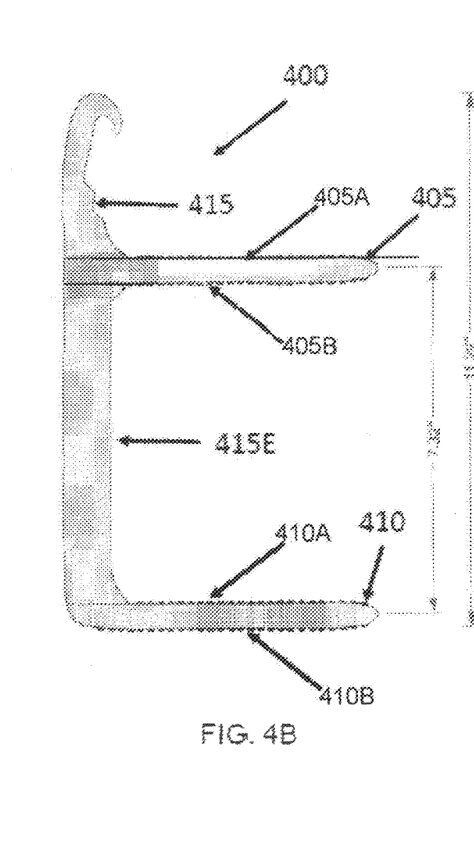
FIG. 4B is a side view of a step apparatus according to embodiments of the present disclosure.
Figure 4C:
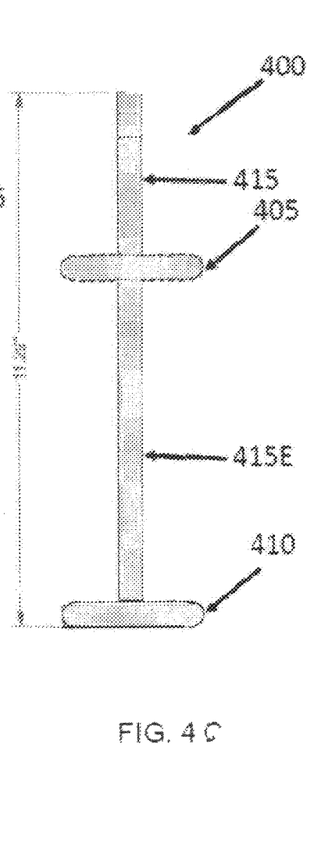
FIG. 4C is a side view of a step apparatus according to embodiments of the present disclosure.
Figures 5A, 5D:
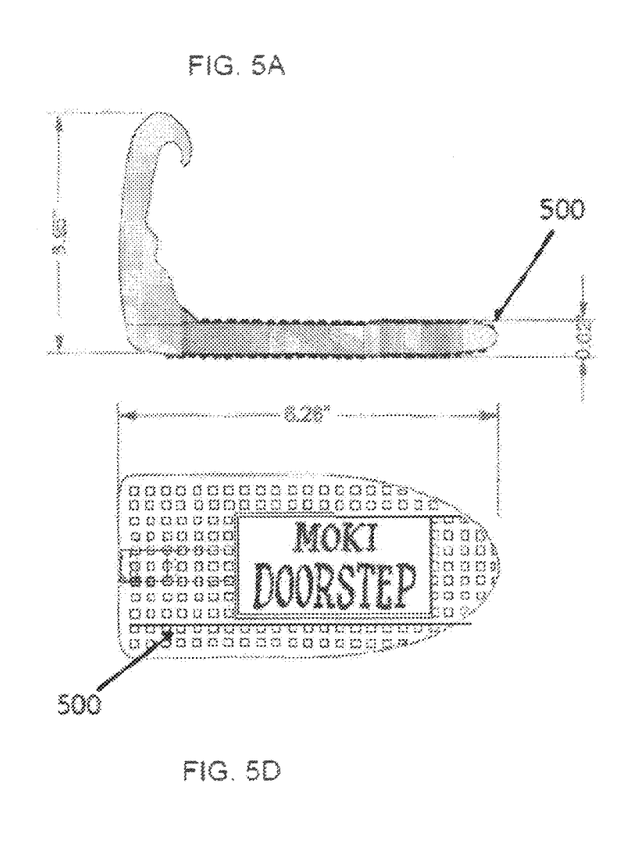
FIG. 5A is a side view of a step apparatus according to embodiments of the present disclosure.
FIG. 5D is a top view of a step apparatus according to embodiments of the present disclosure.
Figure 5B:
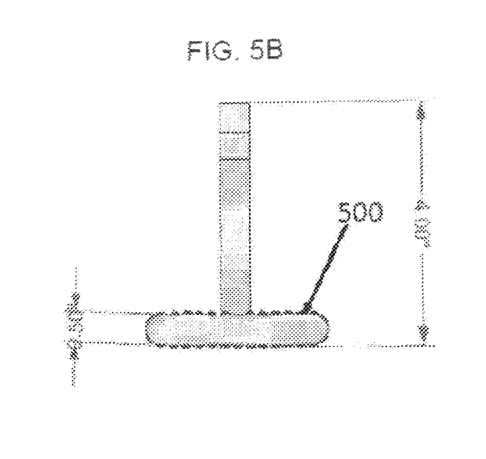
FIG. 5B is a side view of a step apparatus according to embodiments of the present disclosure.
Figure 5C:
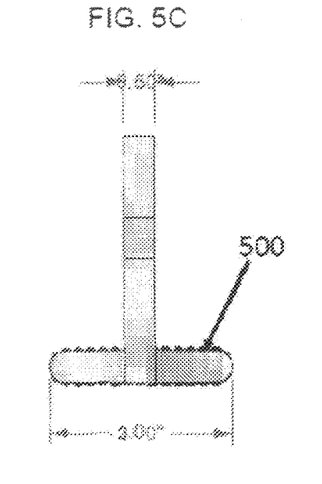
FIG. 5C is a side view of a step apparatus according to embodiments of the present disclosure.
Figure 5E:
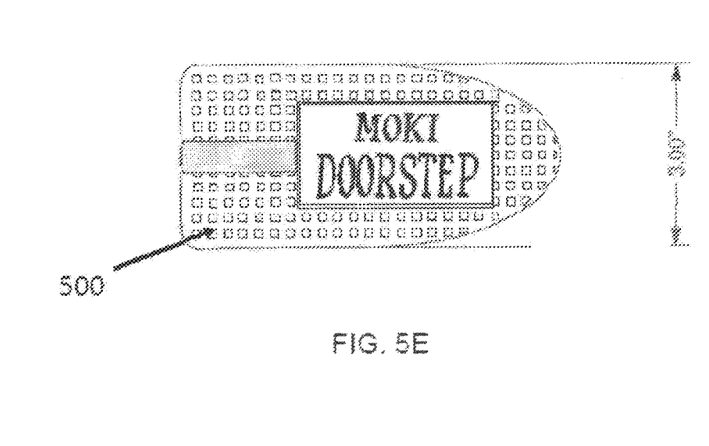
FIG. 5E is a bottom view of a step apparatus according to embodiments of the present disclosure.

The first step structure 405 and the second step structure 410 may be coupled to a single elongate support element 415. The elongate support element 415 may include the features previously discussed with reference to the elongate support element 210, but may additionally include an extension element 415E interconnecting the first step structure 405 to the second step structure 410. Alternatively, the elongate support element 415 may be separate from the extension element 415E (e.g., the elongate support element 415 may couple to a first surface 405A of the first step structure 405 and the extension portion 415 may couple to a second surface 405B of the first step structure 405). FIG. 4A illustrates the step apparatus 400 in the hanging configuration. A length of the extension element 415E may be configured based on the location of the door latch element 100 in a door well, the size of the vehicle, the desired height of the steps with respect to the vehicle and/or the Earth's surface, the desired distance between the first step structure 405 and the second step structure 410, or on any other basis As illustrated in FIGS. 2A through 4C, the step apparatus (200/400) may extend parallel (or substantially parallel) to the door well surface, to which the door latch element 100 is coupled, but within the door well. As further illustrated in FIGS. 2A through 4C, the step structures (205/405/410) may extend perpendicular (or substantially perpendicular) to the door well surface, to which the door latch element 100 is coupled, but within the door well. This is opposed to extending out of the door well towards an exterior or interior of the vehicle. Other configurations are anticipated within the teachings herein, but various embodiments disclosed herein include advantages associated thereto.

The shape of the step structure (205/405/410) can be varied. For example, referring to FIGS. 5A through 5E, a modified step structure 500 is illustrated. The shape of the step structure 500 has been altered to avoid sharp corners at the end of the step structure 500 distal from the door well surface that the step apparatus contacts. The dimensions illustrated in FIGS. 5A through 5E are illustrative only, but nonetheless show what may be deemed beneficial examples of the size contemplated for a step apparatus to be used by a human.

According to the present disclosure, the step structure (205/405/410) can have opposing parallel (or substantially parallel) surfaces that can be interchangeably used depending on how the removable step apparatus (200/400) is coupled to the door latch element 100. In some examples, the elongate support element (210/415) extends perpendicular (or substantially perpendicular) to one or more step structures (205/405/410) and includes a hook-shaped element 225 sized and configured to extend through (and in some uses hang from) the door latch element 100.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, quadrants, thirds, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 routes refers to groups having 1, 2, or 3 routes. Similarly, a group having 1-5 impact zones refers to groups having 1, 2, 3, 4, or 5 impact zones and more or less, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

What is claimed is:

1. A step apparatus, comprising:
   a first step structure; and
   an elongate support element coupled to the first step structure, the elongate support element including a hook-shaped element configured to releasably couple to a latch element coupled to a vehicle door well,
   wherein the elongate support element extends vertically upwardly relative to the first step structure when the hook-shaped element is releasably coupled to the latch element.

2. The step apparatus of claim 1, wherein the latch element includes a U-shaped striker latch element.

3. The step apparatus of claim 1, wherein the hook-shaped element is sized to extend through a void of the latch element.

4. The step apparatus of claim 1, wherein the hook-shaped element is distal from the first step structure along the elongate support element.

5. The step apparatus of claim 1, wherein the first step structure is substantially flat and load bearing when the hook-shaped element is releasably coupled to the latch element.

6. The step apparatus of claim 1, further comprising a second step structure coupled to the elongate support element.

7. The step apparatus of claim 6, wherein:
   the first step structure is coupled to the second step structure via the elongate support element; or
   the first step structure is coupled to the second step structure via an extension element.

8. A step apparatus, comprising:
   a first substantially flat step structure; and
   an elongate support element having a first end and a second end opposite the first end, the first end coupled to the first substantially flat step structure, and the elongate support element including a hook-shaped element on the second end configured to releasably couple to a latch element coupled to a vehicle door well.

9. The step apparatus of claim 8, wherein the first substantially flat step structure is positioned vertically below the latch element when the hook-shaped element is releasably coupled to the latch element.

10. The step apparatus of claim 8, wherein the latch element includes a U-shaped striker latch element.

11. The step apparatus of claim 8, wherein the hook-shaped element is sized to extend through a void of the latch element.

12. The step apparatus of claim 8, wherein the hook-shaped element is distal from the first substantially flat step structure along the elongate support element.

13. The step apparatus of claim 8, wherein the first substantially flat step structure is load bearing when the hook-shaped element is releasably coupled to the latch element.

14. The step apparatus of claim 8, further comprising a second step structure coupled to the elongate support element.

15. The step apparatus of claim 14, wherein:
the first substantially flat step structure is coupled to the second step structure via the elongate support element; or
the first substantially flat step structure is coupled to the second step structure via an extension element.

16. A step apparatus, comprising:
a substantially flat step structure; and
a hook-shaped element coupled to the substantially flat step structure and configured to releasably couple to a latch element coupled to a vehicle door well,
wherein the substantially flat step structure is configured to be stepped on by and support a human when the hook-shaped element is releasably coupled to the latch element.

17. The step apparatus of claim 16, wherein hook-shaped element is formed on a distal end of ab elongate support element, and wherein the elongate support element extends vertically upwardly relative to the substantially flat step structure when the hook-shaped element is releasably coupled to the latch element.

18. The step apparatus of claim 16, wherein the hook-shaped element is sized to extend through a void of the latch element.

19. The step apparatus of claim 16, further comprising an elongate support element coupled to the substantially flat step structure, wherein the hook-shaped element is distal from the substantially flat step structure along the elongate support element.

20. The step apparatus of claim 16, wherein the substantially flat step structure is located below the latch element when the hook-shaped element is releasably coupled to the latch element.

* * * * *